United States Patent

Bruns

[15] 3,704,586
[45] Dec. 5, 1972

[54] STARTING SYSTEM FOR A GAS-TURBINE INSTALLATION

[72] Inventor: Paul-Heinz Bruns, Mulheim, Germany

[73] Assignee: Steinkohlen-Elektrizitat Aktiengesellschaft, Essen, Germany

[22] Filed: Jan. 25, 1971

[21] Appl. No.: 109,358

[30] Foreign Application Priority Data

Feb. 7, 1970 Germany..................P 20 05 722.1

[52] U.S. Cl.............60/39.18 B, 60/39.12, 60/39.14
[51] Int. Cl............F02c 1/04, F02c 5/08, F02c 5/12
[58] Field of Search..........60/39.12, 39.18 B, 39.14, 39.25, 60/39.23

[56] References Cited

UNITED STATES PATENTS

| | | |
|---|---|---|
| 3,552,122 | 1/1971 | Parmegiani et al..................60/39.12 |
| 2,357,041 | 8/1944 | Woolley.........................60/39.18 B |
| 2,318,905 | 5/1943 | Traupel.............................60/39.14 |
| 2,941,790 | 6/1960 | Compton et al......................60/39.14 |
| 2,714,670 | 8/1955 | Linder et al........................60/39.12 |
| 2,632,297 | 3/1953 | Ogston..............................60/39.12 |
| 2,706,150 | 4/1955 | Lloyd...............................60/39.12 |

FOREIGN PATENTS OR APPLICATIONS

H21,455 3/1956 Germany............................60/39.12

Primary Examiner—Carlton R. Croyle
Assistant Examiner—Warren Olsen
Attorney—Karl F. Ross

[57] ABSTRACT

A gas-turbine installation having a pressurized-air hot-gas generator in which a fuel is reacted with the pressurized air, has a high-pressure turbine-driven compressor and a low-pressure turbine-driven compressor in tandem to supply the compressed air for the gasifier, the turbines being operated by the expanding combustible gases from the gasifier. One or both of the turbines may be provided with electrical generators and/or with starting motors and a steam-generating cycle may be provided for operation by the heat of the combustible gases. The starting system of the invention includes a compressed-air reservoir adapted to be charged by one or both of the compressors during normal operation of the system and capable of stirring a volume of air under such pressure that, for starting the system, the gasifier may communicate with the reservoir to generate sufficient hot combustion gases to drive the turbine.

7 Claims, 1 Drawing Figure

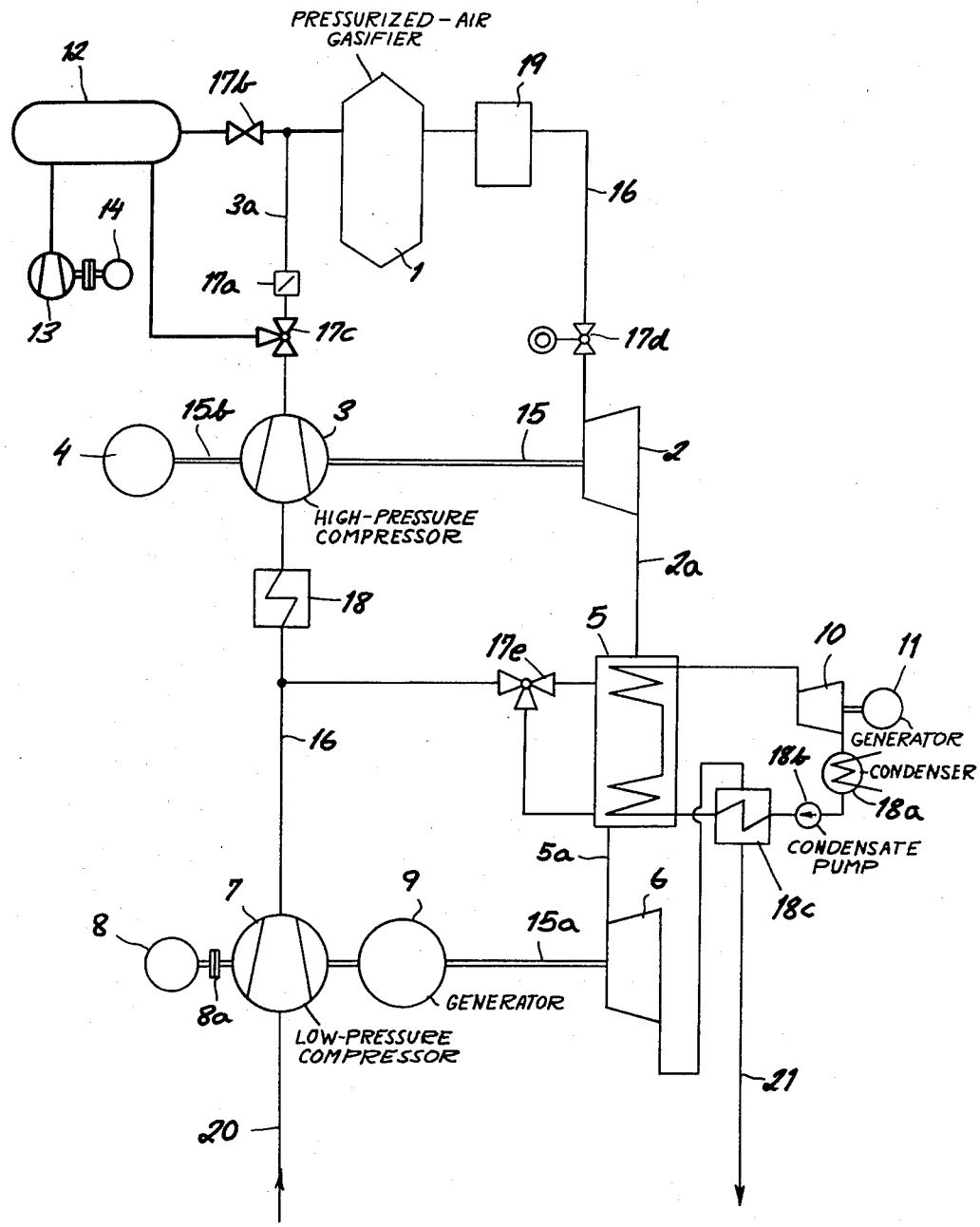

STARTING SYSTEM FOR A GAS-TURBINE INSTALLATION

FIELD OF THE INVENTION

My present invention relates to gas-turbine installations and especially gas-turbine installations for the production of electricity; more particularly, the invention relates to a method of and a system for efficiently starting or bringing into operation a gas-turbine generating plant.

BACKGROUND OF THE INVENTION

In a gas-turbine generating plant, one or more combustors or gasifiers are supplied with fuel which reacts with oxygen, e.g. from the air, to produce a produce a rapidly expanding stream of high-pressure hot gases. The gases are supplied to one or more expansion turbines which can be coupled to electrical generators or motor-generator sets and generally are also connected to compressors for supplying air under pressure to the combustor. Startup of the installation is generally effected by the use of motor-generator sets coupled to the turbine shafts and/or the compressors thereof such that the motors are energized to drive the turbines which, in turn, drive the compressors, the latter supplying air to the gasifier, so that the combustion gases may, in turn, take over the work-performing function.

Such systems have a disadvantage in that an electrical failure, absent a source of standby power, prevents energization of the starting motors and hence prevents the installation from being started. Complex systems must be provided to constitute the stnadby-energy source or to protect the motors against failure. In practice, one avoids the difficulties inherent in starting the installation while maintaining it in operation even when shut-down may be economically practical.

OBJECTS OF THE INVENTION

It is an important object of the present invention to provide an improved starting system for a gas-turbine installation.

It is another object of our invention to provide a gas-turbine electricity-generating plant with improved starting means.

An object of the invention also resides in the provision of an improved gas-turbine plant.

SUMMARY OF THE INVENTION

A gas-turbine installation according to the present invention comprises a pressurized-air gasifier in which a fuel, preferably coal, is reacted with the oxygen contained in high-pressure air to form gaseous combustible products, hereinafter referred to as combustion gas. The combustible gas, according to the present invention, is applied to at least one gas turbine to drive at least one electric generator and at least one compressor which communicates with the gasifier to deliver compressed air at high pressure to the latter. According to the principles of the present invention, a compressed-air reservoir is connected by a valve means to the gasifier and by another valve means to the compressor so that the reservoir or tank may be charged to a high pressure by the compressor and may then be connected to the gasifier to supply the pressurized air required for the initial formation of the combustible gases to drive the turbine.

According to an important feature of this invention, the turbine is connected in series with a steam-generating plant so that residual heat of the combustible gases is used at least in part to convert water to steam in a substantially closed cycle and operate a steam generator contributing to the electrical output of the plant. A boiler may serve as the coupling means between the steam circuit and the gas-turbine circuit.

According to the principles of the present invention, the hot combustion gases are applied to the turbine of a high-pressure compressor communicating selectively with the compressed-air reservoir and the pressurized-air gasifier and with an electrical generator. In tandem with the high-pressure compressor is a low-pressure or precompressor which may be coupled with the main electricity-generating unit and is driven by the combustion gases via a second gas turbine, the combustion gases between these gas turbines traversing the aforementioned boiler. At least the high-pressure compressor is provided with a motor, preferably in the form of a motor generator to supply auxiliary compressed air to the gasifier should the compressed-air reservoir be depleted before the gas-turbine installation has developed full-running characteristics. Another motor may be coupled with the low-pressure compressor.

Among the advantages of the system described above is the low starting time inasmuch as the immediate availability of the pressurized air at the gasifier and the immediate capability of the latter to produce high-pressure combustible gases, bring the expansion turbine stages up to full speed rapidly and permits the compressors to take over the air supply when the compressed air reservoir is depleted.

Means is provided for connecting the pressurized-air reservoir to the pressure-side of the high-pressure compressors between the latter and the gasifier so that a portion of the compressed air supplied by the high-pressure compressor is diverted into the compressed-air reservoir to recharge the latter during normal use. Since the compressed air reservoir is always available during standstill, no special measures are required before starting.

According to another feature of this invention, an auxiliary compressor, driven by a power source independent of the gas-turbine generating system, e.g. an electric motor, is connected to the compressor. While I prefer to pressurize the compressed-air tank solely with the high-pressure fluid derived from the high-pressure compressor connected with the first-stage turbine, I may nevertheless use exclusively the auxiliary compressor or motor to provide the stored energy, in the form of compresses air, which is to serve as the initial driving force on starting. Where most of the output of the high-pressure compressor may have to be delivered to the gas generator upon large electrical demands developing on the generating system, I may use the auxiliary motor and compressor as an added source of compressed air for the reservoir.

While I refer to a single pressurized-gas coal gasifier, it should be understood that a plurality of such gasifiers may be used to feed combustible gases to a single expansion turbine or to respective expansion turbines operating in parallel. In this case, I prefer to dimension the compressed air reservoir to that which can operate all of the gasifiers simultaneously. A system of this type has the advantage that generating installation can be brought from standstill to maximum capacity in the shortest possible time. By providing motor-generator means at, for example, the high-pressure compressor and/or a drive motor at at the low-pressure compressor, the driven compressors can be brought up to an elevated speed from a reduce speed and can supplement the compressed-air source during starting. Another advantage of the system is that an additional combustible-gas demands necessitated by the load may be supplied substantially instantaneously by the compressed-air source alone or in conjunction with the motor generator or starting motor.

DESCRIPTION OF THE DRAWING

The above and other objects, features and advantages of the present invention will become more readily apparent from the following description, reference being made to the accompanying drawing in which the sole FIGURE is a flow diagram illustrating the invention.

SPECIFIC DESCRIPTION

In the drawing, I show a pressurized-air coal gasifier 1 which discharges into an expansion turbine 2 coupled by a shaft 15 to a high-pressure compressor 3, the pressure side of which is connected at 3a to an inlet of the combustor 1. The partially depleted combustible gas is fed at 2a into a boiler 5, constituting part of a steam-generating circuit and thereafter passes at 5a into a further expansion turbine 6 which is coupled by the shaft 15a with the main electric generator 9, with a low-pressure compressor 7 and a starting motor 8 which may be connected with the compressor by a clutch 8a.

Ambient air is supplied at substantially atmospheric pressure via line 20 to the low-pressure compressor 7 and thereupon passes through a heat exchanger 18 ahead of the high-pressure compressor 3.

The steam-generating circuit comprises a steam turbine 10 driving an electric generator 11 and connected in series with the coils of the boiler 5. condenser heat-exchanger 18a lies in series with the turbine 10 together with a condensate pump 18b. A heater 18c is provided to heat the liquid which is circulated through the boiler 5. The heat supplied at 18c is the residual heat carried by the combustion gases emerging from the turbine 6 and conducted through the heat exchanger 18c is represented by line 21.

A motor-generator set 4 is mechanically coupled with the turbine 2 by a shaft 15b and is consequently connected with the compressor 3 to enable it to drive the turbine 2 and the compressor 3 in its motor mode of operation.

A compressed-air reservoir 12 is connected via a valve 17b to the combustor 1 and is, moreover, connected to the output side of the compressor 3 by a two-way valve 17c which distributes compressed air from the high-pressure compressor 3 to either the gasifier 1 or the compressed-air tank 12. Charging of the compressed-air tank 12 may also be accomplished via a compressor 13 and its motor 14 which is independent of the gas-turbine system.

A valve 17b is provided between the compressed-air tank 12 and the pressurized-air combustor 1 while a pressure-control valve 17a is provided in the line between the high-pressure compressor 3 and the gasifier 1. To prevent damage to the expansion turbine, as may result from corrosive components of the combustion gas, a gas washer 19 is provided in series with the gasifier 1 and the expansion turbine 2. A further valve 17d controls the rate of feed of the combustion gases to the expansion turbine 2 and yet another valve 17e permits air from the low-pressure compressor to be bled to the boiler 5 for combustion of the gases therein.

An important feature of this invention resides in the provision of a compressed-air storage vessel 12 which contains sufficient compressed air to operate all of the gasifiers 1 for a period sufficient to allow the compressor 3, in tandem with the low-speed compressor 7, to supply sufficient air to operate the gasifiers. When this occurs, the installation can be switched over from its idle condition to its normal power state.

OPERATION AND SPECIFIC EXAMPLE

The turbine installation illustrated in the drawing of course operates in accordance with conventional principles for the starting technique which is unique to the present invention. Consequently, the operation may be described with respect to a specific Example which is intended to be merely illustrative.

With the gas-turbine installation of the drawing in its inoperative state, 400 $m^3$ of compressed air is stored in the tank 12 at 36 atmospheres gauge and ambient temperature. To start the system, 30,000 $m^3$ per hour (STP) of compressed air is discharged via valve 17b into the gasifier 1 in which powdered coal is re-formed into a combustible gas at 19 atmospheres absolute and a temperature of 200°C, after washing at 19. The combustible gas is supplied at 79.5 kg/sec to the expansion turbine 2 and has a heat content of 1320 Kcal/kg.

The combustible gases containing carbon monoxide and emerging from the expansion turbine 2 are led at a pressure of 9.62 atmospheres absolute and a temperature of 162°C to the boiler 5 as a fuel gas. This fuel gas has a sensible heat content of 340 Kcal/kg and is supplied at a rate of 79.5 kg/sec. The fuel gases burned in the boiler 5 with 284.1 kg/sec of oxygen supplied via valve 17e from the low-pressure compressor 7 to produce an exhaust gas at 5a at a pressure of 9.5 atmospheres absolute, 300 Kcal/hour and a temperature of 804°C at a rate of 363.6 kg/sec. The expansion turbine 6 is driven with this exhaust gas to produce a depleted gas at a temperature of 399°C and a heat content of 1078 Kcal/kg which is delivered to the heat-exchanger 18c of the steam cycle. The final exhaust gas has a heat content of only 26.6 Kcal/kg and can be disposed of at 21.

The superheated steam derived from the boiler 5 at a pressure of 130 atmospheres absolute, a temperature of 525°C and a rate of 340 metric tons/hour is used to drive the steam turbine 10 which operates the power generator 11 at an output of 96 megawatts.

The low-pressure compressor 7, driven by the turbine 6, is supplied with ambient air at 20 at a temperature of 15°C, a pressure of 760 torr and at a rate of 340 kg/sec. During startup, the motor 8 may be operated at 2.2 megawatts at a speed of 600rpm to provide low-pressure air to the compressor 3 while the latter is driven by the air from tank 12, via the gasifier, etc. A major contribution of 74 megawatts is provided by the generator 9 driven by the gas turbine 6.

The low-pressure air delivered via a heat exchanger 18 to the compressor 3 has a temperature of 307°C and a pressure of 9.62 atmospheres/gauge and is operated at a rate of 340 kg/sec. The output from the high-pressure compressor 3 consists of air at a pressure of 22 atmospheres gauge and a temperature of 225°C which is supplied with a heat content of 54.5 Kcal/kg at a rate of 35.4 kg/sec. The motor generator 4 which may contribute start torque to the compressor 3 has a speed of 3000 rpm and consumes 1.8 megawatts when operated as a starting motor to assist the compressed air from tank 12. After starting, it functions as a generator to produce 0.445 megawatts. During nonpeak periods, the compressor 3 or the compressors 13, connected to the electrical output of the installation, pressurizes the tank 12 so that the compressed air is available at the time of the next starter.

The improvement described and illustrated is believed to admit of many modifications within the ability of persons skilled in the art, all such modifications being considered within the spirit and scope of the invention except as limited by the appended claims.

We claim:

1. A gas-turbine electricity-generating installation, comprising:
   a. a pressurized-air fuel gasifier for producing a high-pressure combustible gas stream;
   b. a high-pressure turbocompressor driven by said high-pressure combustible gas stream and discharging a low-pressure combustible gas stream while supplying high-pressure compressed air to said gasifier;
   c. a boiler connected to said high-pressure turbocompressor and heated by the combustion of said low-pressure combustible gas stream for generating high-pressure steam and discharging a waste gas;
   d. a steam-driven electrical generator connected to said boiler and operated by the high-pressure steam therefrom to produce electricity;
   e. a low-pressure turbocompressor driven by said waste gas for supplying low-pressure air to said high-pressure turbocompressor; and
   f. means for starting said installation and including a compressed-air reservoir of a pressure-and-volume capacity sufficient to operate said gasifier in the absence of air from said high-pressure turbocompressor for a period sufficient to permit the combustible gases from said gasifier to drive said high-pressure turbocompressor,
   means for connecting said reservoir to said gasifier for starting said installation, and
   means for charging said reservoir with compressed air.

2. The installation defined in claim 1, further comprising:
   g. a starting motor connected with said low-pressure turbocompressor and operable concurrently with the supply of compressed air from said reservoir to said gasifier.

3. The installation defined in claim 2 wherein the means for charging said reservoir with compressed air includes means for connecting the output of said high-pressure turbocompressor with said reservoir.

4. The installation defined in claim 2 wherein said means for charging said reservoir with compressed air includes a further compressor driven by a motor supplied with electrical energy from a source independent of the installation.

5. The installation defined in claim 2, further comprising:
   h. an electrical generator coupled with said low-pressure turbocompressor and driven by said waste gas.

6. The installation defined in claim 5, further comprising:
   i. means for preheating the feed to said boiler with the waste gas emerging from said low-pressure turbocompressor.

7. The installation defined in claim 6, further comprising:
   j. a motor generator connected to said high-pressure turbocompressor.

* * * * *